United States Patent [19]

Schlecher et al.

[11] Patent Number: 4,909,773
[45] Date of Patent: Mar. 20, 1990

[54] SWIVEL COUPLING

[75] Inventors: Erich Schlecher; Johann Kreidl; Günther Hantschk, all of Waldkraiburg, Fed. Rep. of Germany

[73] Assignee: Netzsch-Mohnopumpen GmbH, Fed. Rep. of Germany

[21] Appl. No.: 211,809

[22] Filed: Jun. 27, 1988

[30] Foreign Application Priority Data

Jul. 3, 1987 [DE] Fed. Rep. of Germany ....... 3722097

[51] Int. Cl.⁴ .................................................. F16D 3/18
[52] U.S. Cl. ........................................ 464/16; 464/159
[58] Field of Search ............... 403/37, 38, 359; 464/7, 464/16, 158, 159

[56] References Cited

U.S. PATENT DOCUMENTS

| 1,770,743 | 7/1930 | Morgan. | |
| 2,510,414 | 6/1950 | Philbrick | 464/16 X |
| 2,842,945 | 7/1958 | Swanson. | |
| 2,974,501 | 3/1961 | Kaufman et al.. | |
| 3,142,972 | 8/1964 | Spaulding, Jr. | 464/159 |
| 3,153,921 | 11/1964 | Shenk et al.. | |
| 3,199,311 | 8/1965 | Hill. | |
| 3,375,901 | 4/1968 | Farrell | 464/16 X |
| 3,427,825 | 2/1969 | John et al. | 464/159 |
| 3,718,209 | 2/1973 | Moslo. | |
| 4,004,433 | 1/1977 | Calistrat | 464/159 X |

FOREIGN PATENT DOCUMENTS

| 1142473 | 7/1955 | Fed. Rep. of Germany. | |
| 1172488 | 6/1964 | Fed. Rep. of Germany | 464/159 |
| 1750739 | 5/1968 | Fed. Rep. of Germany. | |
| 1963755 | 12/1969 | Fed. Rep. of Germany. | |
| 2811607 | 3/1978 | Fed. Rep. of Germany. | |
| 2033538 | 5/1980 | United Kingdom. | |

Primary Examiner—Daniel P. Stodola
Attorney, Agent, or Firm—Kenyon & Kenyon

[57] ABSTRACT

Two pairs of axial force transmitting coupling members (22, 24) and one pair of torque transmitting coupling members (26, 28) are arranged inside a housing (20). An annular cavity (42) each is formed in the housing (20) between each of the two pairs of axial force transmitting coupling members 922, 24) and the pair of torque transmitting coupling members (26, 28). A lubricant inlet opening (44) adapted to be closed opens into one of the annular cavities (42). An air outlet opening (54) is provided at the housing (20) at least approximately diametrically opposite the lubricant inlet opening (44) and communicates with the other of the two annular cavities (42) and likewise can be closed. In this manner the cavities (42) can be filled with liquid lubricant and freed of entrapped air in full measure in a short time.

4 Claims, 3 Drawing Sheets

SWIVEL COUPLING

The invention relates to a swivel coupling, especially for use on a universal-joint shaft of an eccentric worm machine, comprising two pairs of axial force transmitting coupling members, each pair including a ball socket and a spherical segment supported therein, a pair of torque transmitting coupling members, arranged between the two pairs of axial force transmitting coupling members, a housing which encloses the said pairs of coupling members and includes an annular cavity between each of the two pairs of axial force transmitting coupling members and the pair of torque transmitting coupling members, and a lubricant inlet opening which is formed in the housing, opens into one of the annular cavities and comprises a closure member.

Couplings of this kind are used predominantly for eccentric worm pumps or motors comprising an eccentrically revolving rotor and being connected to a stationarily supported input or output shaft by way of a universaljoint shaft which has a swivel coupling of the generic type in question arranged at either end.

In a known coupling (DE-OS 17 50 739) of the type specified, the two spherical segments, each supported in a respective ball socket, form part of a hub which, in general, is substantially spherical and comprises axis parallel grooves in an equatorial zone located between the spherical segments. These grooves of the hub are open radially outwardly and each positioned opposite a radially inwardly open groove provided in the inner wall of the housing. Each groove of the hub, together with the radially opposed groove of the housing, receives a ball. The balls are guided, in addition, in an annular race arranged between the hub and the housing and connected to the housing and the hub by substantially radially disposed levers, whereby it is controlled such that the centers of all balls always lie in an angle bisecting plane between the axes of the shafts to be coupled by the swivel coupling, thus warranting a homokinetic transmission of movement between the two shafts.

This known swivel coupling comprises an annular cavity each at both sides of the race. A radial threaded bore formed in the housing opens into one of these cavities. It serves as a filling inlet for lubricant and is closed by a threaded plug during operation. The two annular cavities mentioned communicate through grooves formed in the ball sockets with axially outer cavities adjacent the two end faces of the hub.

If it is possible at all to completely fill the cavities in the housing with lubricant, that requires a lot of patience in the case of this known swivel coupling. Usually it must be assumed that a noticeable amount of air remains enclosed in the housing, preventing the filling with lubricant to become anywhere near complete.

The same is true of another known swivel coupling (DE-PS 11 42 473) with which two shaft ends project into a common multipart housing and each carry a spherical hub. In an equatorial zone of each of the hubs there are external teeth and, at either side thereof, a ring of spherical segment shape, separated each by a respective annular cavity. The external teeth of each hub mesh with internal teeth formed in the housing, while the rings of spherical segment shape of each hub engage a ball socket each fixed to the housing. This swivel coupling comprises a lubricant inlet opening in the central range of t he housing, likewise adapted to be closed by a threaded plug. The lubricant inlet opening opens into a central cavity which communicates through axis parallel passages with the neighboring annular cavities. Again, complete filling with lubricant hardly can be achieved because air remains entrapped at least in the more remote annular cavities. If at all possible, displacing this air by the filled in lubricant is time-consuming.

As a consequence of incomplete lubricant filling, the air enclosed in the housing expands more than the lubricant as the coupling runs hot in operation. This may lead to high excess pressure in the coupling and result in part of the enclosed air and of the lubricant as well being pressed past the housing seals and getting to the outside. Then, as the coupling cools down, correspondingly low pressure results in the cavities thereof, and that may cause foreign matter to be drawn into the coupling from the surroundings. Thereby the service life of the coupling may become cut short, particularly so if abrasive and/or corrosive working or flow medium circulates around the coupling, as is frequently the case with universal joint couplings for eccentric worm machinery.

It is, therefore, an object of the invention to develop a swivel coupling of the kind described initially such that its cavities can be filled completely or almost completely in little time with liquid lubricant.

This object is met, in accordance with the invention, in that an air outlet opening is provided at the housing at least approximately diametrically opposite the lubricant inlet opening and in communication with the other one of the two annular cavities, said air outlet opening likewise comprising a closure member.

This arrangement of inlet and outlet openings provides the opportunity of filling the coupling from below with liquid lubricant. The lubricant thus does not reach the air outlet opening disposed at the top until it has filled, at least almost entirely, the annular cavities at both sides of the pair of torque transmitting coupling members. The positioning of the lubricant inlet opening and the air outlet opening with respect to each other thus forces the lubricant to flow diametrically through the coupling, whereby entrapped air is removed to a great extent, if not entirely.

As with the two known couplings described above, the pair of torque transmitting coupling members of the swivel coupling according to the invention may comprise grooves arranged in two concentric circles, extending between the two annular cavities, and cooperating, to transmit torque, with counterbodies to the profile of which the groove profile is adapted. The counterbodies may be spheres, as in the case of the first known coupling mentioned above (DE-OS 17 50 739), or teeth meshing with grooves in the form of gaps between teeth of a counter-toothing, as with the second known coupling (DE-PS 11 42 473).

With both per se known embodiments specified above of the swivel coupling according to the invention, normally, it may be expected that there is some clearance, caused by the manufacturing process or required in operation, between the torque transmitting coupling members. This permits lubricant to flow more or less quickly from one of the annular cavities to the other.

However, it is preferable that, in accordance with a further development of the invention, a counterbody each is omitted near the lubricant inlet opening and the air outlet opening so that a groove each is left free to act as lubricant channel or passage between the two annular cavities. Generally, the omission of two counterbodies, such as balls or teeth, is quite acceptable. At any rate, it can be compensated by providing for a correspondingly greater number of counterbodies, such as balls or teeth, in the areas which remain between the two lubricant passages.

The swivel coupling according to the invention, preferably, is modified further in that the grooves are formed by tooth gaps in an internally toothed ring inserted into the housing, or by grooves formed by tooth gaps in an external toothing, the two grooves designed as the lubricant passages have a depth which is less than the tooth height of the external teeth, two teeth of the external teeth matching with the lubricant passages are omitted, and at least one of said closure members engages in a recess of the ring formed with internal teeth, which recess opens into one of the lubricant passages.

In this manner it can be excluded reliably that the connections are not established, because of faulty assembly, which are provided between the lubricant inlet opening and the annular cavity at one side of the pair of torque transmitting coupling members or between the air outlet opening and the annular cavity at the other side of the pair of torque transmitting coupling members.

The swivel coupling according to the invention, furthermore, may have the features below in common with the known coupling described initially: that each of the two pairs of axial force transmitting coupling members comprises two overflow passages being arranged at least approximately diametrically opposite each other to connect the adjacent annular cavity to an axially outer cavity. This per se known embodiment may be developed further, in accordance with the invention, in that the overflow passages and the external teeth alike are formed in the spherical segment, and the two places at which a tooth each of the external teeth is omitted lie at least approximately in the same diametral plane as the overflow passages.

Thus, whenever the lubricant inlet opening is located at the bottom, not only one of the lubricant passages but also the overflow passages leading to the axially outer cavities will be positioned at the bottom and, accordingly, the other two overflow passages and the remaining lubricant passage will be located at the top just like the air outlet opening. In this manner both the annular cavities directly adjacent the pair of torque transmitting coupling members at both sides thereof and also the axially outer cavities can be filled completely or at least almost completely, without delay.

It is likewise advantageous if the overflow passages have a larger cross sectional area than the annular cavities at both sides of the pair of torque transmitting coupling members.

Finally, it is of advantage if the lubricant inlet opening and the air outlet opening are designed alike and provided with identical closure members.

The invention will be described further, by way of example, with reference to the accompanying drawings, in which.

Figure 1:
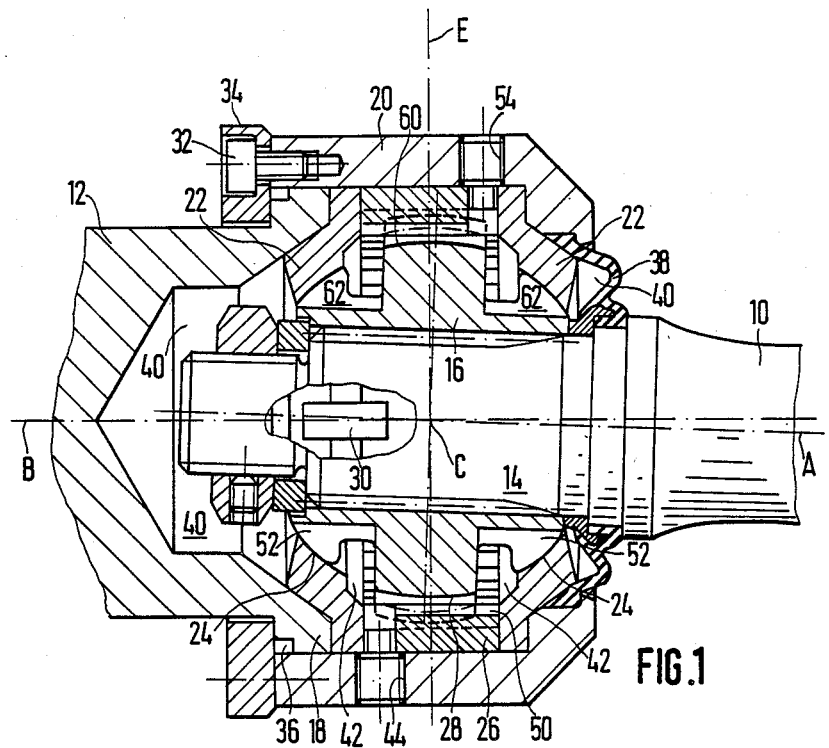
FIG. 1 is an axial sectional elevation of a swivel coupling of an eccentric worm pump.

The swivel coupling illustrated connects one end of a universal-joint shaft 10 with one end of a helical or worm-type rotor 12 of an eccentric worm pump. At its end not shown, the universal-joint shaft 10 is connected by another substantially similar swivel coupling to a drive shaft which is journalled stationarily.

The universal-joint shaft 10 is formed, at the end shown, with a pin 14 including a plurality of grooves in its surface on which a substantially spherical hub 16 is fixed. At the end of the rotor 12 a collar 18 is formed to which housing 20 is secured.

The geometric axes A and B of the universal-joint shaft 10 and of the rotor 12 intersect at point C which is the center of the swivel coupling as a whole. During operation the axis A of the universal-joint shaft 10 moves on a cone shaped geometrical surface the tip of which is the center of the second swivel coupling (not shown). The axis B of the rotor 12, on the other hand, moves on a cylindrical geometrical surface. No matter what the position of the two axes A and B, their common plane is a diametral plane D. A central plane E which is perpendicular to the axis B of the rotor 12 passes through the center C.

Inside the housing 20, two ball sockets 22 are centered with respect to the rotor 12 and arranged symmetrically with respect to the central plane E. Together with a spherical segment 24 formed at the hub 16, each of the two ball sockets 22 presents a pair of axial force transmitting coupling members 22, 24. The mutually abutting faces of the ball sockets 22 and spherical segments 24 are spherical sliding faces whose center is C.

A ring 26 formed with internal teeth is fixed in the housing 20 between the two ball sockets 22, centrally with respect to the axis A and symmetrically with respect to the central plane E The ring 26 with the internal teeth cooperates with external teeth 28 formed at the hub 16 between the two spherical segments 24 to constitute a pair of torque transmitting coupling members 26, 28. Relative rotations between the housing 20, the ball sockets 22, and the ring 26 with its internal teeth are prevented by keys 30 arranged equally spaced circumferentially in the housing 20.

The whole swivel coupling is held together in axial direction by bolts 32 securing a ring 34 to the housing 20 which ring engages over the collar 18. An annular seal 36 is clamped between ring 34 and collar 18. At the other end of the swivel couplung, the right end in FIGS. 1 and 2, a sealing boot 38 establishes a seal between the housing 20 and the universal-joint shaft 10.

Figure 2:
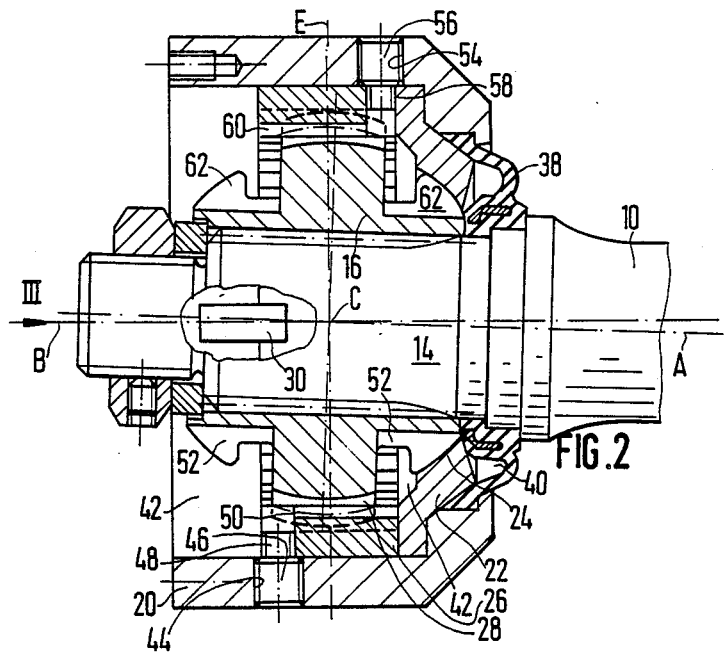
FIG. 2 is the same axial sectional view showing parts of the swivel coupling.
Figure 3:
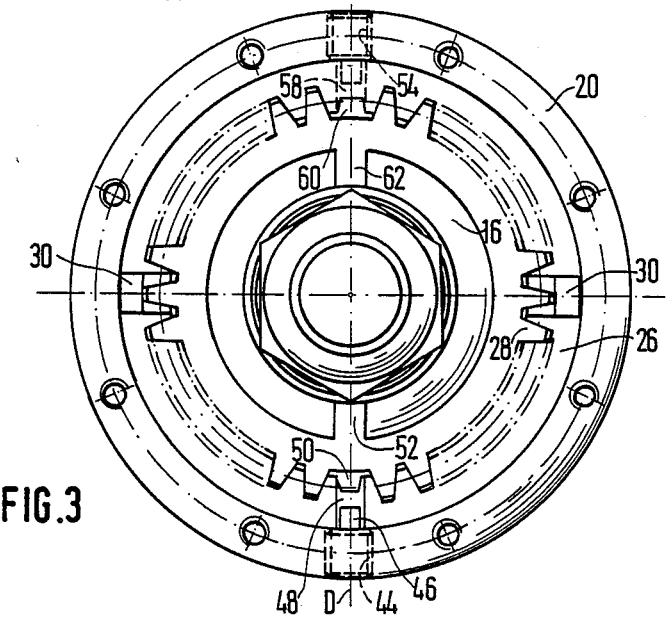
FIG. 3 is a sectional elevation as seen in the direction of arrow III in FIG. 2.
Figure 4:
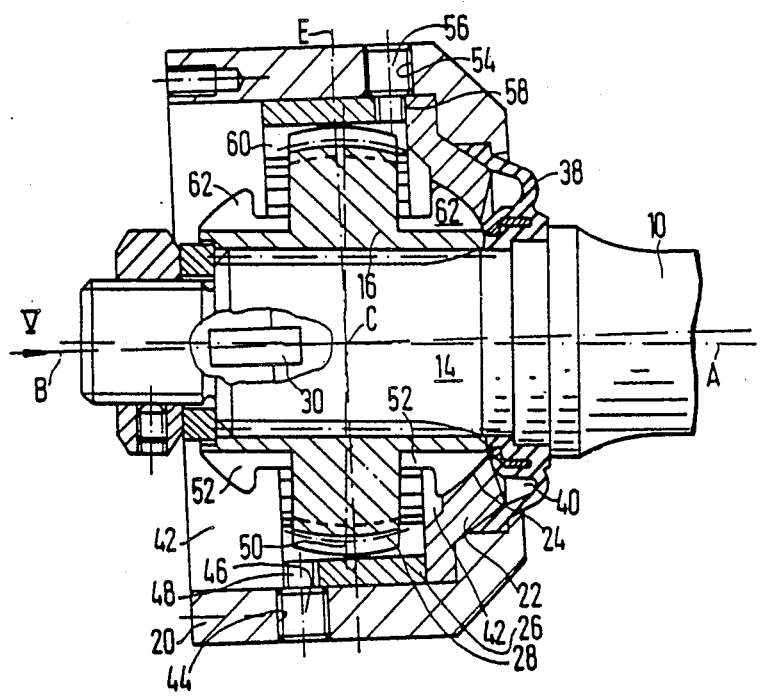
FIG. 4 is an axial sectional view showing parts of another swivel coupling.
Figure 5:
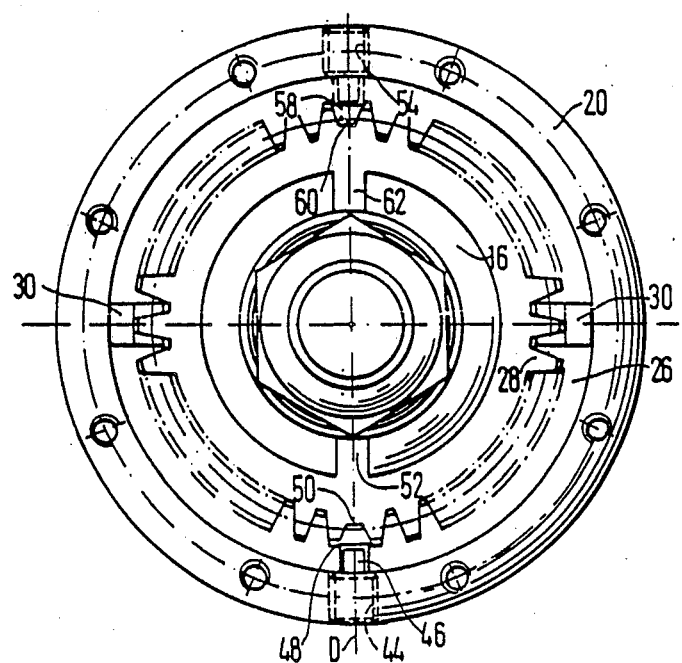
FIG. 5 is a sectional elevation as seen in the direction of arrow V in FIG. 4.

An outer cavitiy 40 is formed axially outside each of the two ball sockets 22 within the housing 20. These two cavities 40 are further defined by an end face each of the hub 16. The left hand cavity 40 in FIG. 1 moreover is defined by the rotor 12, while the right hand cavitiy 40 in FIG. 1 is defined in addition by the sealing boot 38. Axially inwardly of each of the two ball sockets 22 there is an annular cavity 42.

The swivel coupling shown, as described thus far, corresponds to the one known from EP-B-01 33 325. With the known coupling, cavities 40 and 42 are partly filled with lubricant prior to assembly.

In contrast to that, in the case of the swivel coupling illustrated, each of the cavities 40 and 42 is to be filled completely with lubricant after the assembly, before putting the swivel coupling into operation.

To this end, the housing 20 comprises a lubricant inlet opening 44 at its lower side, when in the position shown Opening 44 is formed by a radial threaded bore and is closed tightly by a closure member 46 threaded into the bore. The closure member 46 has a pin-like radial inner end, with respect to the housing 20, engaging in a radial recess 48 formed in the internally toothed ring 26. The recess 48 is followed by a lubricant passage 50 extending parallel to the axis B of the rotor 12 and defined by a tooth gap between two- teeth of the internally toothed ring 26. A tooth is missing in the external teeth 28 in the area of the tooth gap described so that the lubricant passage 50 is kept totally free. The height of the tooth gap constituting the lubricant passage 50, as measured in radial direction, is less than the tooth height of the external teeth 28. Consequently, it is impossible to mount the internally toothed ring 26 such that one of the external teeth would engage in the lubricant passage 50.

Both ends of the lubricant passage 50 communicate directly with a radially outer range of one of the two annular cavities 42 each. Two overflow passages 52 lie in the same diametral plane D as the lubricant passage 50. They are formed in one of the ball sockets 22 each, starting from a radially inner range of one each of the two annular cavities 42, and open into one each of the axially outer cavities 40.

The housing 20 is provided with an air outlet opening 54 diagonally opposite the lubricant inlet opening 44. This opening is formed by a radial threaded bore of the same size as the lubricant inlet opening 44 and likewise closed tightly by a closure member 56 threaded into the bore. The air outlet opening 54 lies in the same diametral plane D as the lubricant inlet opening 44 but communicates, through a recess 58, with that annular cavity 42 which has no direct radial connection with the lubricant inlet opening 44.

Diametrically opposite the lubricant passage 50, the two annular cavities 42 communicate with each other through an air outlet and lubricant passage 60. A pair of overflow passages 62 are disposed in the same diametral plane D as this air outlet and lubricant passage 60. They each connect one of the axially outer cavities 40 with the adjoining annular cavity 42.

What is claimed is:

1. A swivel coupling, especially for use on a universal-joint shaft of an eccentric worm machine, comprising two pairs of axial force transmitting coupling members (22, 24) each such pair including a ball socket (22) and a spherical segment (24) supported therein, a pair of torque transmitting coupling members (26, 28) arranged between the two pairs of axial force transmitting coupling members (22, 24), a housing (20) which encloses the said pairs of coupling members (22, 24; 26, 28) and includes an annular cavity (42) between each of the two pairs of axial force transmitting coupling members (22, 24) and the pair of torque transmitting coupling members (26, 28), and a lubricant inlet opening (44) which is formed in the housing (20), opens directly into one of the annular cavities (42), and comprises a closure member (46), wherein an air outlet opening (54) is provided at the housing (20) diagonally opposite the lubricant inlet opening (44) and in direct communication with the other one of the two annular cavities (42), said air outlet opening (44) likewise comprising a closure member (56), wherein the pair of torque transmitting coupling members (26, 28) comprises grooves disposed in two concentric rings, extending between said two annular cavities (42), and cooperating with counterbodies to the profile of which the groove profile is adapted for transmitting torque, wherein a counterbody each is omitted near the lubricant inlet opening (44) and the air outlet opening (54), whereby one groove each is left free to act as lubricant passage (50 and 60, respectively) between the two annular cavities, wherein said grooves are formed by tooth gaps in an internally toothed ring (26) inserted into the housing (20), the two grooves designated as the lubricant passages (50, 60) have a depth which is less than the tooth height of the external teeth (28); two teeth of the external teeth (28) matching with the lubricant passages (50, 60) are omitted; and at least one of the closure members (46, 56) engages in a recess (48 and 58, respectively) of the ring (26) formed with internal teeth, which recess opens into one of the lubricant passages (50, 60), wherein each of the two pairs of axial force transmitting coupling members (22, 24) comprises two overflow passages (52, 62), being arranged at least approximately diametrically opposite each other to connect the adjacent annular cavity (42) to an axially outer cavity (40), and wherein the overflow passages (52, 62) and the external teeth (28) alike are formed in the spherical segment (24), and the two places at which a tooth each of the external teeth (28) is omitted lie at least approximately in the same diametral plane (D) as the overflow passages (52, 62).

2. The swivel coupling as claimed in claim 1, wherein the overflow passages (52, 62) have a larger cross sectional area than the annular cavities (42) at both sides of the pair of torque transmitting coupling members (26, 28).

3. A swivel coupling, especially for use on a universal-joint shaft of an eccentric worm machine, comprising two pairs of axial force transmitting coupling members (22, 24) each such pair including a ball socket (22) and a spherical segment (24) supported therein, a pair of torque transmitting coupling members (26, 28) arranged between the two pairs of axial force transmitting coupling members (22, 24), a housing (20) which encloses the said pairs of coupling members (22, 24; 26, 28) and includes an annular cavity (42) between each of the two pairs of axial force transmitting coupling members (22, 24) and the pair of torque transmitting coupling members (26, 28), and a lubricant inlet opening (44) which is formed in the housing (20), opens into one of the annular cavities (42), and comprises a closure member (46), wherein an air outlet opening (54) is provided at the housing (20) at least approximately diametrically opposite the lubricant inlet opening (44) and in communication with the other one of the two annular cavities (42), said air outlet opening (44) likewise comprising a closure member (56), wherein the pair of torque transmitting coupling members (26, 28) comprises grooves disposed in two concentric rings, extending between said two annular cavities (42), and cooperating with counterbodies to the profile of which the groove profile is adapted for transmitting torque, wherein a counterbody each is omitted near the lubricant inlet opening (44) and the air outlet opening (54), wherein one groove each is left free to act as lubricant passage (50 and 60, respectively) between the two annular cavities, wherein said grooves are formed by tooth gaps in an internally toothed ring (26) inserted into the housing (20); the two grooves designed as the lubricant passages (50, 60) have a depth which is less than the tooth height of the external teeth (28); two teeth of the external teeth (28) matching with the lubricant passages (50, 60) are omitted; and at least one of the closure members (46, 56) engages in a recess (48 and 58, respectively) of the ring (26) formed with internal teeth, which recess opens into one of the lubricant passages (50, 60), wherein each of the two pairs of axial force transmitting coupling members (22, 24) comprises two overflow passages (52, 62), being arranged at least approximately diametrically opposite each other to connect the adjacent annular cavity (42) to an axially outer cavity (40), and wherein the overflow passages (52, 62) and the external teeth (28) alike are formed in the spherical segment (24), and the two places at which a tooth each of the external teeth (28) is omitted lie at least approximately in the same diametral plane (D) as the overflow passages (52, 62).

4. A swivel coupling, especially for use on a universal-joint shaft of an eccentric worm machine, comprising two pairs of axial force transmitting coupling members (22, 24) each such pair including a ball socket (22) and a spherical segment (24) supported therein, a pair of torque transmitting coupling members (26, 28) arranged between the two pairs of axial force transmitting coupling members (22, 24), a housing (20) which encloses the said pairs of coupling members (22, 24; 26, 28) and includes an annular cavity (42) between each of the two pairs of axial force transmitting coupling members (22, 24) and the pair of torque transmitting coupling members (26, 28), and a lubricant inlet opening (44) which is formed in the housing (20), opens into one of the annular cavities (42), and comprises a closure member (46), wherein an air outlet opening (54) is provided at the housing (20) at least approximately diametrically opposite the lubricant inlet opening (44) and in communication with the other one of the two annular cavities (42), said air outlet opening (44) likewise comprising a closure member (56), wherein the pair of torque transmitting coupling members (26, 28) comprises grooves disposed in two concentric rings, extending between said two annular cavities (42), and cooperating with counterbodies to the profile of which the groove profile is adapted for transmitting torque, wherein a counterbody each is omitted near the lubricant inlet opening (44) and the air outlet opening (54), whereby one groove each is left free to act as lubricant passage (50 and 60, respectively) between the two annular cavities, wherein said grooves are formed by tooth gaps in an external toothing (28); the two grooves designed as the lubricant passages (50, 60) have a depth which is less than the tooth height of the external teeth (28); two teeth of the external teeth (28) matching with the lubricant passages (50, 60) are omitted; and at least one of the closure members (46, 56) engages in a recess (48 and 58, respectively) of the ring (26) formed with internal teeth, which recess opens into one of the lubricant passages (50, 60), wherein each of the two pairs of axial force transmitting coupling members (22, 24) comprises two overflow passages (52, 62), being arranged at least approximately diametrically opposite each other to connect the adjacent annular cavity (42) to an axially outer cavity (40), and wherein the overflow passages (52, 62) and the external teeth (28) alike are formed in the spherical segment (24), and the two places at which a tooth each of the external teeth (28) is omitted lie at least approximately in the same diametral plane (D) as the overflow passages (52, 62).

* * * * *